(12) United States Patent
Schlosser (10) Patent No.: US 10,571,322 B2
(45) Date of Patent: Feb. 25, 2020

(54) MEASURING A SPATIOTEMPORAL RELATIONSHIP BETWEEN TWO OF MORE POSITIONS OF A VIBRATORY ELEMENT

(71) Applicant: Micro Motion, Inc., Boulder, CO (US)

(72) Inventor: Martin Andrew Schlosser, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 167 days.

(21) Appl. No.: 15/560,604

(22) PCT Filed: Apr. 10, 2015

(86) PCT No.: PCT/US2015/025233
§ 371 (c)(1),
(2) Date: Sep. 22, 2017

(87) PCT Pub. No.: WO2016/164034
PCT Pub. Date: Oct. 13, 2016

(65) Prior Publication Data
US 2018/0052024 A1 Feb. 22, 2018

(51) Int. Cl.
*G01F 1/84* (2006.01)
*G01F 25/00* (2006.01)

(52) U.S. Cl.
CPC ........ *G01F 1/8427* (2013.01); *G01F 25/0007* (2013.01)

(58) Field of Classification Search
CPC ............................ G01F 1/8427; G01F 25/0007
See application file for complete search history.

(56) References Cited

U.S. PATENT DOCUMENTS

| 4,660,421 A | 4/1987 | Dahlin et al. |
| 4,711,132 A * | 12/1987 | Dahlin ................. G01F 1/8422 73/861.356 |
| 4,782,224 A | 11/1988 | Haas et al. |
| 5,020,380 A * | 6/1991 | Keita ..................... G01F 1/8427 73/861.357 |
| 5,798,835 A * | 8/1998 | Kotidis ............. G01N 21/1717 356/432 |
| 6,722,209 B1 * | 4/2004 | Fan ....................... G01F 1/8413 73/861.355 |
| 7,117,751 B2 | 10/2006 | Berger et al. |

(Continued)

FOREIGN PATENT DOCUMENTS

| DE | 102012220505 A1 | 5/2014 |
| EP | 0275367 A2 | 7/1988 |

(Continued)

*Primary Examiner* — David J Bolduc
(74) *Attorney, Agent, or Firm* — The Ollila Law Group LLC (57) ABSTRACT

An emitter-sensor assembly (100) for measuring a spatiotemporal relationship between two or more positions of a vibratory element (12) is provided. The emitter-sensor assembly (100) includes an emitter (110) substantially rigidly coupled to a first position (12a) of the vibratory element (12), the emitter (110) configured to emit electro-magnetic radiation (112) towards a second position (12b) of the vibratory element (12), and a sensor (120) substantially rigidly coupled to the first position (12a) of the vibratory element (12), the sensor (120) configured to receive the electro-magnetic radiation (112) reflected from the second position (12b) of the vibratory element (12).

17 Claims, 6 Drawing Sheets

(56) References Cited

U.S. PATENT DOCUMENTS

| | | | | |
|---|---|---|---|---|
| 2003/0097881 A1* | 5/2003 | Schlosser | ............... | G01F 1/8404 |
| | | | | 73/861.355 |
| 2003/0097882 A1* | 5/2003 | Schlosser | ............... | G01F 1/8404 |
| | | | | 73/861.355 |
| 2005/0150311 A1* | 7/2005 | Berger | .................. | G01F 1/8427 |
| | | | | 73/861.355 |
| 2006/0042402 A1* | 3/2006 | Bell | ...................... | G01F 1/8422 |
| | | | | 73/861.357 |
| 2006/0243066 A1* | 11/2006 | Mehendale | ........... | G01F 1/8422 |
| | | | | 73/861.353 |
| 2007/0034019 A1* | 2/2007 | Doihara | ................ | G01F 1/8409 |
| | | | | 73/861.355 |
| 2008/0115588 A1* | 5/2008 | Zwikker | ............... | G01F 1/8413 |
| | | | | 73/861.355 |
| 2009/0013800 A1* | 1/2009 | Mehendale | ........... | G01F 1/8413 |
| | | | | 73/861.356 |
| 2010/0122585 A1* | 5/2010 | Brouwer | ............... | G01F 1/8427 |
| | | | | 73/861.357 |
| 2011/0224920 A1* | 9/2011 | Ruiter | ................ | A61M 5/14212 |
| | | | | 702/45 |
| 2012/0186363 A1* | 7/2012 | Egner | .................. | G01F 1/8427 |
| | | | | 73/861.357 |

FOREIGN PATENT DOCUMENTS

| | | | |
|---|---|---|---|
| EP | 2177383 A1 | 4/2010 | |
| EP | 2187184 A1 | 5/2010 | |
| JP | S52030479 A | 3/1977 | |
| JP | H01174909 A | 7/1989 | |
| JP | 07280514 A | 10/1995 | |
| JP | 2003177049 A | 6/2003 | |

\* cited by examiner

MEASURING A SPATIOTEMPORAL RELATIONSHIP BETWEEN TWO OF MORE POSITIONS OF A VIBRATORY ELEMENT

TECHNICAL FIELD

The embodiments described below relate to measuring spatiotemporal relationships of two or more positions and, more particularly, to measuring a spatiotemporal relationship between two or more positions of a vibratory element.

BACKGROUND

Vibratory meters, such as Coriolis flow meters, typically include a sensor assembly with one or more vibratory elements. The vibratory elements may be flow tubes, tuning forks, or the like, that carry or are suspended in a material to be measured. A driver vibrates the one or more vibratory elements to induce a response by the sensor assembly. The response by the sensor assembly is used to determine properties of the material.

To measure the response, the sensor assembly can include two or more pickoff sensors that can be employed to determine a spatiotemporal relationship between two or more positions on the vibratory element. For example, a first pickoff sensor may be at a first position and a second pickoff sensor may be at a second position. Each of the pickoff sensors may measure a spatiotemporal property such as, for example, velocity, displacement, or acceleration. The measurements from the two or more sensors can be combined to determine the spatiotemporal relationship between the two or more positions. For example, signals from the two or more sensors may be subtracted to determine a phase difference between the two or more positions.

The spatiotemporal relationship of the two or more positions may correspond to the properties of the material. For example, in Coriolis flow meters, the phase difference between the first and second position may be correlated with the flow rate of the fluid flowing through a vibrating tube. By determining the phase difference between the two or more positions on the vibrating tube, the flow rate can be determined. Other properties may also be determined and other spatiotemporal relationships can be employed.

Although the two or more sensors at the two or more locations can be employed to determine the spatiotemporal relationship between the two or more positions, it may be advantageous to use alternative designs that do not employ the two or more sensors. For example, it may be advantageous to employ a single sensor that measures the spatiotemporal relationship. Advantages can include simpler vibratory sensor assembly design and more reliable measurements. Accordingly, there is a need for measuring a spatiotemporal relationship between two or more positions of a vibratory element.

SUMMARY

An emitter-sensor assembly for measuring a spatiotemporal relationship between two or more positions of a vibratory element is provided. According to an embodiment, the emitter-sensor assembly comprises an emitter substantially rigidly coupled to a first position of the vibratory element. The emitter is configured to emit electro-magnetic radiation towards a second position of the vibratory element. The emitter-sensor assembly further comprises a sensor substantially rigidly coupled to the first position of the vibratory element. The sensor is configured to receive the electro-magnetic radiation reflected from the second position of the vibratory element.

A method for measuring a spatiotemporal relationship between two or more positions of a vibratory element is provided. According to an embodiment, the method comprises emitting electro-magnetic radiation from a first position of the vibratory element, reflecting the electro-magnetic radiation from a second position of the vibratory element, and receiving the electro-magnetic radiation reflected from the second position. The electro-magnetic radiation is received by a sensor rigidly coupled to the first position.

A system for measuring a spatiotemporal relationship between two or more positions of a vibratory element is provided. According to an embodiment, the system comprises an emitter-sensor assembly rigidly coupled to a first position of the vibratory element and a reflective surface that is one of disposed at and disposed away from a second position of the vibratory element. The emitter-sensor assembly is configured to emit electro-magnetic radiation towards the second position of the vibratory element and receive the electro-magnetic radiation reflected from the second position.

ASPECTS

According to an aspect, an emitter-sensor assembly (100) for measuring a spatiotemporal relationship between two or more positions of a vibratory element (12) comprises an emitter (110) substantially rigidly coupled to a first position (12a) of the vibratory element (12), the emitter (110) configured to emit electro-magnetic radiation (112) towards a second position (12b) of the vibratory element (12), and a sensor (120) substantially rigidly coupled to the first position (12a) of the vibratory element (12), the sensor (120) configured to receive the electro-magnetic radiation (112) reflected from the second position (12b) of the vibratory element (12).

Preferably, the emitter-sensor assembly (100) comprises a lens (130) that is positioned to receive the electro-magnetic radiation (112) reflected from the second position (12b) of the vibratory element (12) and direct the electro-magnetic radiation (112) towards the sensor (120).

Preferably, at least one of the emitter (110) and the sensor (120) is disposed at the first position (12a).

Preferably, at least one of the emitter (110) and the sensor (120) is disposed away from the first position (12a).

Preferably, the emitter (110) is a light emitting diode or a laser.

Preferably, the sensor (120) is a position sensor detector that detects the position of the electro-magnetic radiation (112) on sensing area (122) of a photodiode.

Preferably, the vibratory element (12) is a flow tube in a flow meter (5).

According to an aspect, a method for measuring a spatiotemporal relationship between two or more positions of a vibratory element comprises emitting electro-magnetic radiation from a first position of the vibratory element, reflecting the electro-magnetic radiation from a second position of the vibratory element, and receiving the electro-magnetic radiation reflected from the second position, the electro-magnetic radiation being received by a sensor rigidly coupled to the first position.

Preferably, the method further comprises determining a movement of the second position along an axis relative to the position of the first position on the axis.

Preferably, the method further comprises vibrating the vibratory element with a driver, wherein the vibratory element comprises a flow tube in a flow meter and twisting the vibratory element with Coriolis forces such that the second position is displaced relative to the first position.

Preferably, reflecting the electro-magnetic radiation from the second position comprises reflecting the electro-magnetic radiation from a surface of the vibratory element at the second position.

Preferably, reflecting the electro-magnetic radiation from the second position comprises reflecting the electro-magnetic radiation from a surface that is rigidly coupled to the second position.

According to an aspect, a system (15) for measuring a spatiotemporal relationship between two or more positions of a vibratory element (12) comprises an emitter-sensor assembly (100) rigidly coupled to a first position (12a) of the vibratory element (12) and a reflective surface (200) that is one of disposed at and disposed away from a second position (12b) of the vibratory element (12), wherein the emitter-sensor assembly (100) is configured to emit electro-magnetic radiation (112) towards the second position (12b) of the vibratory element (12) and receive the electro-magnetic radiation (112) reflected from the second position (12b).

Preferably, the reflective surface (200) is a portion of the vibratory element (12) at the second position (12b).

Preferably, the reflective surface (200) is a surface that is rigidly coupled to the second position (12b).

Preferably, the emitter-sensor assembly (100) is comprised of an emitter (110) substantially rigidly coupled to the first position (12a) of the vibratory element (12), the emitter (110) configured to emit electro-magnetic radiation (112) towards the second position (12b) of the vibratory element (12) and a sensor (120) substantially rigidly coupled to the first position (12a) of the vibratory element (12), the sensor (120) being configured to receive the electro-magnetic radiation (112) reflected from the second position (12b) of the vibratory element (12).

Preferably, the electro-magnetic radiation (112) is light.

BRIEF DESCRIPTION OF THE DRAWINGS

The same reference number represents the same element on all drawings. It should be understood that the drawings are not necessarily to scale.

DETAILED DESCRIPTION

FIGS. 1-9 and the following description depict specific examples to teach those skilled in the art how to make and use the best mode of embodiments of measuring a spatiotemporal relationship between two or more positions of a vibratory element. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of measuring the spatiotemporal relationship of the two or more positions of the vibratory element. As a result, the embodiments described below are not limited to the specific examples described below, but only by the claims and their equivalents.

The following specific examples include a system with an emitter-sensor assembly that is rigidly coupled to a first position of a vibratory element. An emitter in the emitter-sensor assembly emits electro-magnetic radiation towards a second position of the vibratory element. A reflective surface that is disposed at or away from the second position reflects the electro-magnetic radiation towards the first position. A sensor in the emitter-sensor assembly receives the electro-magnetic radiation. The sensor can provide a signal that is proportional to the position of the electro-magnetic radiation received by the sensor. The signal may be provided to electronics, such as meter electronics, which can use the signal to calculate a spatiotemporal relationship between the first and second position on the vibratory element.

Figure 1:
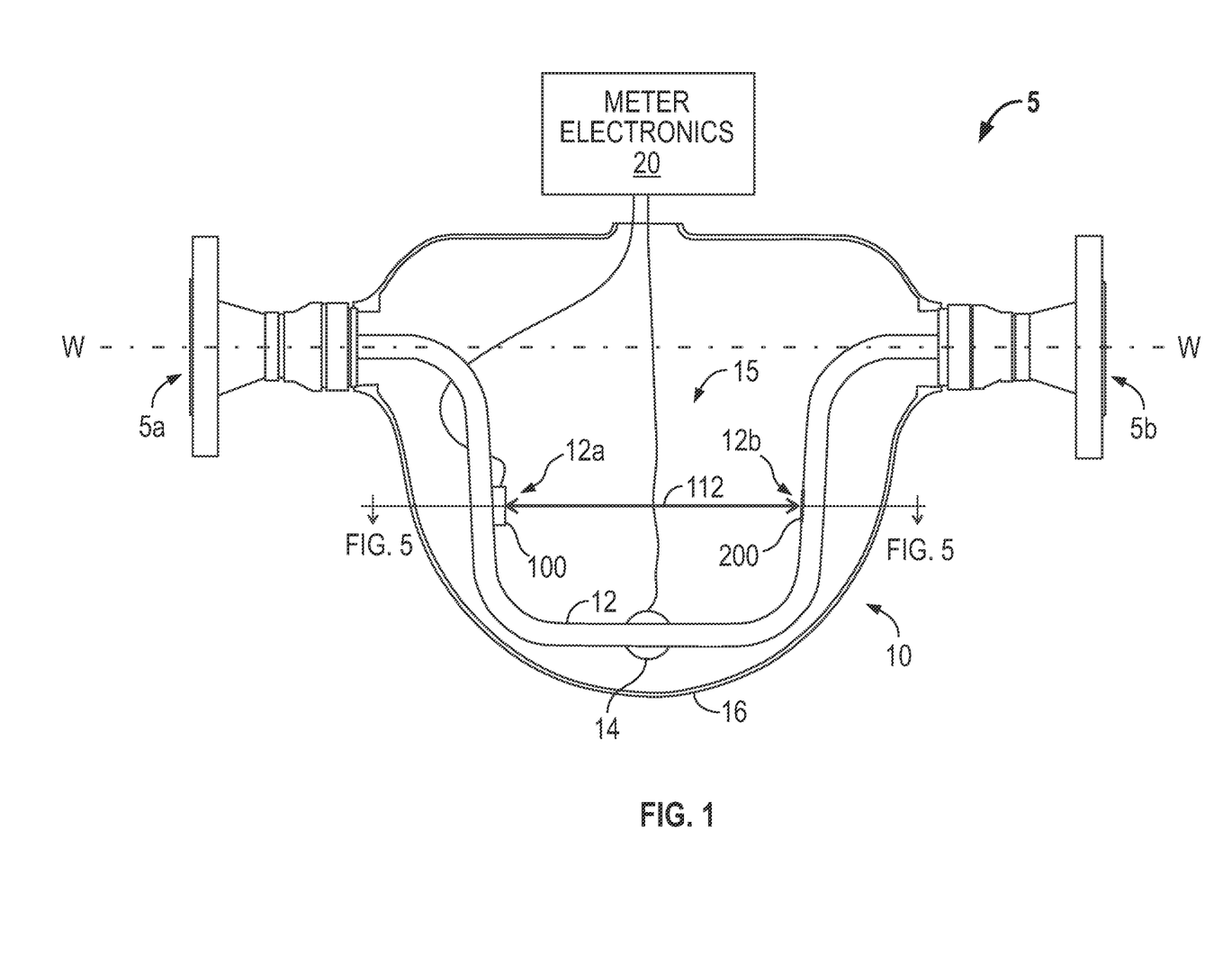
FIGS. 1 and 2 respectively show a front and a side plan view of a system 15 for measuring a spatiotemporal relationship between two or more positions of a vibratory element 12 according to an embodiment.
Figure 2:
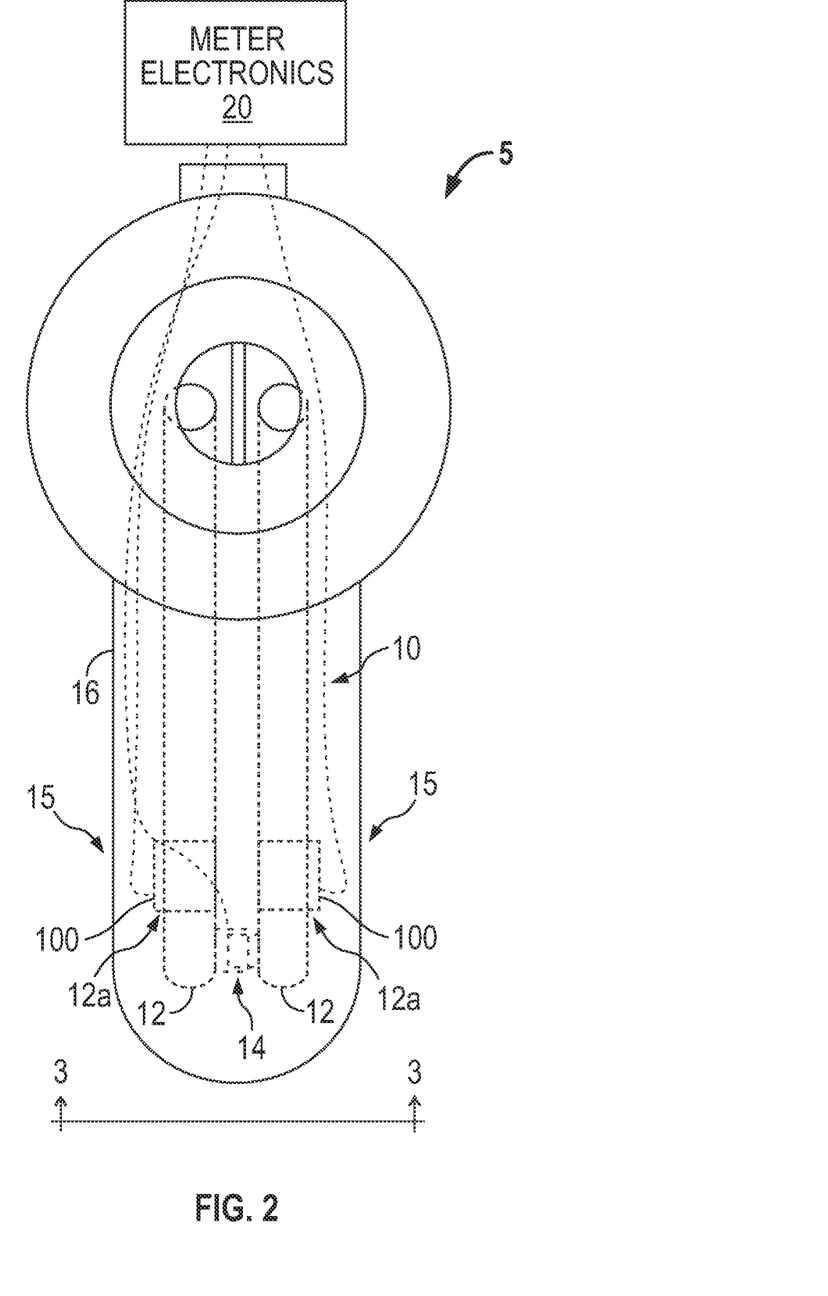

FIGS. 1 and 2 respectively show a front and a side plan view of a system 15 for measuring a spatiotemporal relationship between two or more positions of a vibratory element 12 according to an embodiment. As shown in FIGS. 1 and 2, the system 15 is employed in a flow meter 5 that includes a sensor assembly 10 and a meter electronics 20. The sensor assembly 10 includes two flow tubes (one flow tube is shown due to the depicted front view) and a driver 14. Surrounding the sensor assembly 10 is a housing 16 that extends from an inlet 5a and an outlet 5b. The inlet 5a and the outlet 5b are coupled to vibratory elements 12 in the sensor assembly 10. Also shown in FIG. 1 is a sectional line FIG. 5.

The vibratory element 12 is one of the flow tubes shown in FIGS. 1 and 2. The vibratory element 12 has a first position 12a and a second position 12b. An emitter-sensor assembly 100 is disposed at the first position 12a and is communicatively coupled to the meter electronics 20. The emitter-sensor assembly 100 emits electro-magnetic radiation 112 towards the second position 12b. The electro-magnetic radiation 112 is reflected by a reflective surface 200, which is a surface of the vibratory element 12 at the second position 12b. The emitter-sensor assembly 100 receives the reflected electro-magnetic radiation 112. As will be explained in more detail in the following with reference to FIGS. 5, 6, and 7, the system 15, which, in the embodiment shown, is comprised of the emitter-sensor assembly 100 and the reflective surface 200, can measure a spatiotemporal relationship between the first position 12a and the second position 12b.

Still referring to FIGS. 1 and 2, the flow meter 5 may be a Coriolis flow meter although any suitable vibratory meter may be employed. The flow meter 5 can determine the property and movement of material in the vibratory elements 12. The flow meter 5 includes the system 15 to measure a spatiotemporal relationship between the first position 12a and the second position 12b. The spatiotemporal relationship between the first position 12a and the second position 12b of one of the vibratory elements 12 is used to determine one or more properties of the material in the vibratory element 12. For example, the spatiotemporal relationship may be a phase difference between the first position 12a and the second position 12b. Additionally or alternatively, the spatiotemporal relationship may be a time delay, difference in velocity, acceleration, or the like.

As shown, the vibratory element 12 is a U-shaped flow tube although any suitable shape may be employed. For example, curves, bows, lines (e.g., straight flow tubes), and other shapes may be employed in alternative embodiments. Due to the U-shape, the vibratory element 12 may have surfaces that are substantially parallel. For example, a portion of the surface at the first position 12a may be substantially parallel to a portion of a surface at the second position 12b. However, the surfaces may not necessarily be parallel in alternative embodiments. For example, in the curve and bow shapes described in the foregoing, the vibratory elements may not have parallel surfaces at a first and second positions but are nevertheless used to measure a spatiotemporal relationship between two or more positions on the vibratory element, which may be vibrated by the driver 14.

The driver 14 is configured to vibrate the vibratory element 12. In the embodiment shown, the driver 14 is comprised of a coil and magnet. The coil may receive a drive signal from the meter electronics 20. The drive signal may be a sinusoidal electrical signal although any suitable signal or composite of signals may be employed. The drive signal causes the driver 14 to apply a force to the vibratory element 12. The force may have properties that correspond to parameters of the drive signal. For example, the force may oscillate at a frequency that is the same as a frequency of the drive signal. Additionally or alternatively, an amplitude of the force may be proportional to an amplitude of the drive signal.

The vibratory element 12 may respond to the force by bending about a bend axis W shown in FIG. 1. The vibratory element 12 may bend about the bend axis W in the direction of the force applied by the driver 14. The direction of the force may be perpendicular to a plane that is formed by the vibratory element 12. Accordingly, the vibratory element 12 at the location of the driver 14 may be displaced perpendicular to the plane formed by the vibratory element 12. The force and the bending may be in other directions in the same or alternative embodiments. Alternative embodiments may employ brace bars, wherein the bend axis W traverses the brace bars, or the like.

The vibratory element 12 may also have various vibration modes. For example, the vibratory element 12 may vibrate in an out of phase bend mode ("drive mode") where the two vibratory elements 12 bend in opposite directions. If the vibratory elements 12 are only vibrating in the drive mode, then the first position 12a and the second position 12b are bending without a phase difference. That is, the phase difference between the two positions 12a, 12b may be zero. The vibratory element 12 may also have a flow-induced twist, carried by the drive mode ("twist mode"), which is described in more detail in the following with reference to FIGS. 3 and 4.

Still referring to FIGS. 1 and 2, the system 15 provides a signal to the meter electronics 20. The signal provided by the system 15 may include a measurement of a spatiotemporal relationship between the two positions 12a, 12b. Using the signal, the meter electronics 20 is configured to determine the properties of the material flowing through the vibratory element 12. Exemplary meter electronics, the properties of the material, and how the material properties can be determined from the phase difference and other parameters of the vibration response are described in U.S. Pat. No. 8,720,281 to Hays et al. as well as other references. Further discussion of the meter electronics 20 is omitted for the sake of brevity.

In the system 15 shown, the emitter-sensor assembly 100 is attached to the vibratory element 12 at the first position 12a. Accordingly, the emitter-sensor assembly 100 is substantially rigidly coupled to the vibratory element 12 at the first position 12a. However, the emitter-sensor assembly 100 can be substantially rigidly coupled to the first position 12a and not be at the first position 12a. For example, the emitter-sensor assembly 100 could be substantially rigidly coupled to the vibratory element 12 with a bracket, or the like. Accordingly, the emitter-sensor assembly 100 could be disposed away from the first position 12a. In addition, the emitter-sensor assembly 100 could be comprised of components, each of which is individually affixed, indirectly coupled, or the like, to the first position 12a.

Due to being substantially rigidly coupled to the first position 12a, the emitter-sensor assembly 100 may move with the first position 12a. Accordingly, the position of the emitter-sensor assembly 100 corresponds to the position of the first position 12a. This allows the measurements made by the emitter-sensor assembly 100 to be spatial measurements of the first position 12a. For example, in an embodiment where the emitter-sensor assembly 100 is coupled to the first position 12a via a bracket, the position of the emitter-sensor assembly 100 relative to the first position 12a may be known. Accordingly, the position of the emitter-sensor assembly 100 relative to the first position 12a may be included in the processing by the meter electronics 20.

Similarly, a reflective surface, which is shown to be a portion of the surface of the vibratory element 12 at the second position 12b, may be affixed or coupled to the second position 12b in alternative embodiments. Accordingly, the reflective surface may be disposed away from the second position 12b in alternative embodiments. For example, the reflective surface may be disposed proximate to the second position with a bracket. In the embodiment shown, the reflective surface 200 is disposed at the second position 12b.

Also, in the embodiment shown, the reflective surface 200 has a curve due to being the surface on the vibratory element 12. However, in alternative embodiments, the reflective surface 200 may have a different shape, such as, for example, a flat shape. The flat shape may be due to a different shaped vibratory element or a flat surface that is substantially rigidly coupled to the vibratory element 12. For example, a flat mirror could be coupled to the second position 12b.

In these and other embodiments, the emitter-sensor assembly 100 and the reflective surface 200 may be employed to measure the spatiotemporal relationship between the first position 12a and the second position 12b. An exemplary spatiotemporal relationship is a phase difference between the first position 12a and the second position 12b when the vibratory element 12 is vibrating with the twist mode, as is described in more detail in the following with reference to FIGS. 3 and 4.

Figure 3:
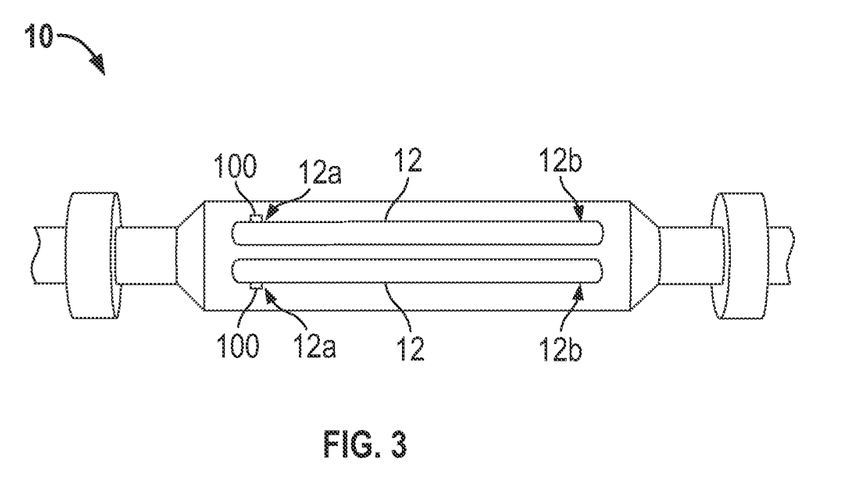
FIGS. 3 and 4 show a bottom perspective view of the sensor assembly 10 described in the foregoing with reference to FIGS. 1 and 2.
Figure 4:
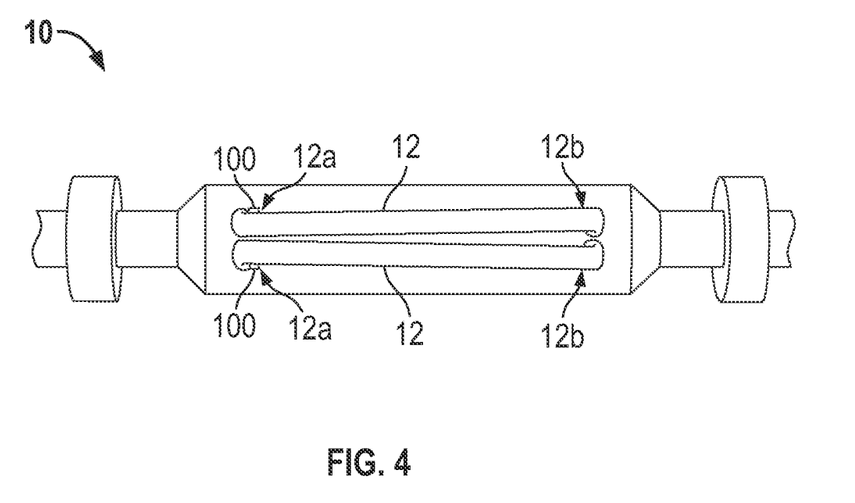

FIGS. 3 and 4 show a bottom perspective view of the sensor assembly 10 described in the foregoing with reference to FIGS. 1 and 2. The vibratory element 12, first position 12a, second position 12b, and the emitter-sensor assembly 100 are shown. For illustration purposes, the driver 14, the housing 16, and the meter electronics 20 are not shown. Also not shown is the reflective surface 200, although it can be appreciated that the reflective surface 200 is disposed at the second position 12b. FIG. 3 shows a non-driven mode and FIG. 4 shows a twist mode due to Coriolis forces. FIGS. 3 and 4 therefore illustrate the effect of the twist mode on the spatiotemporal relationship between the first position 12a and the second position 12b.

As can be appreciated, the spatiotemporal relationship between the first position 12a and the second position 12b is different in the non-driven mode shown in FIG. 3 than the twist mode shown in FIG. 4. In FIG. 3, the vibratory elements 12 are in the non-driven mode where the driver 14 is not vibrating the vibratory elements 12. That is, the driver 14 is not applying the force to the vibratory element 12. In FIG. 4, the material is flowing through the vibratory elements 12 while the driver 14 vibrates the vibratory elements 12. Due to the material flow causing Coriolis forces, the vibratory elements 12 are vibrating with the twist mode. In the twist mode, the first position 12a and the second position 12b on each of the vibratory elements 12 have a phase difference.

For example, material flowing through the vibratory element 12 can induce Coriolis forces in the vibratory element 12. The Coriolis forces can cause the second position 12b to lead the first position 12a. That is, the first position 12a has a time delay relative to the second position 12b. The time delay is proportional to the phase difference between the two positions 12a, 12b, the proportionality being determined by a vibration frequency of the vibratory elements 12. The phase difference can be a distance between the two positions 12a, 12b in a direction perpendicular to the plane formed by one of the vibratory elements 12. As will be explained in more detail in the following with reference to FIGS. 5, 6, and 7, the phase difference can be measured by the emitter-sensor assembly 100 even though the emitter-sensor assembly 100 is only at the first position 12a.

Figure 5:
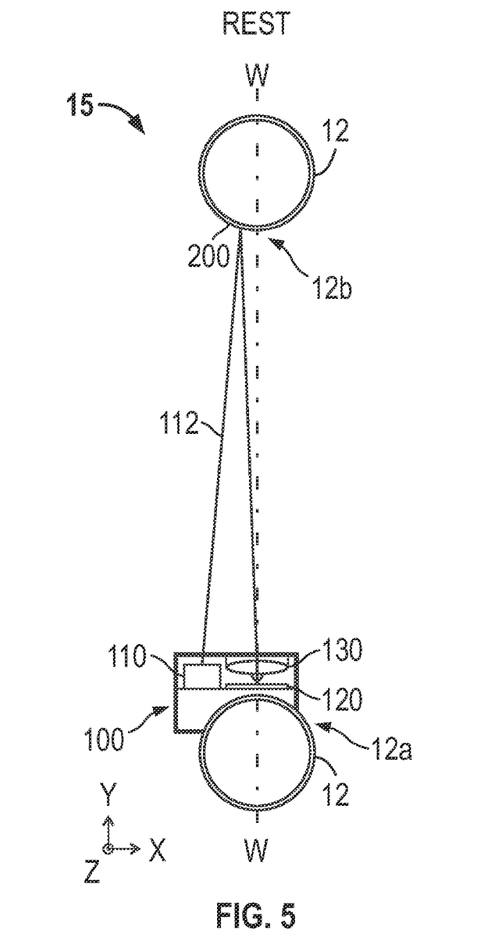
FIGS. 5, 6, and 7 show a sectional view of the system 15 taken from FIG. 1.
Figure 6:
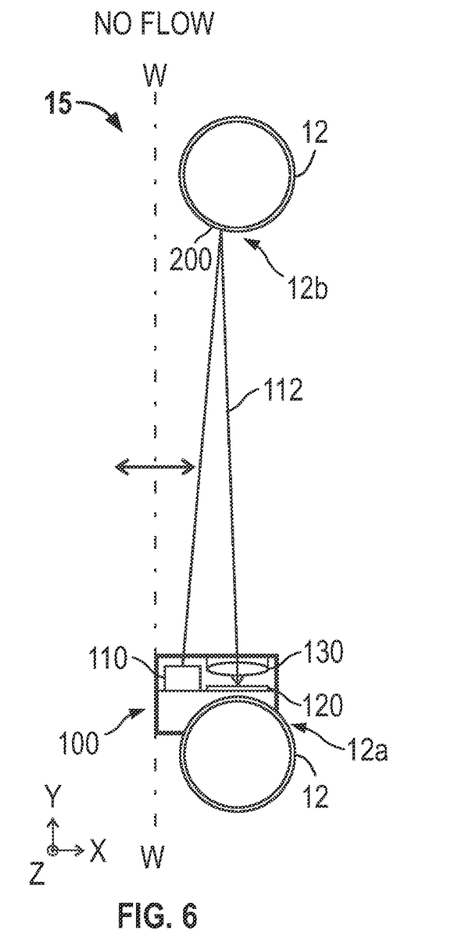
Figure 7:
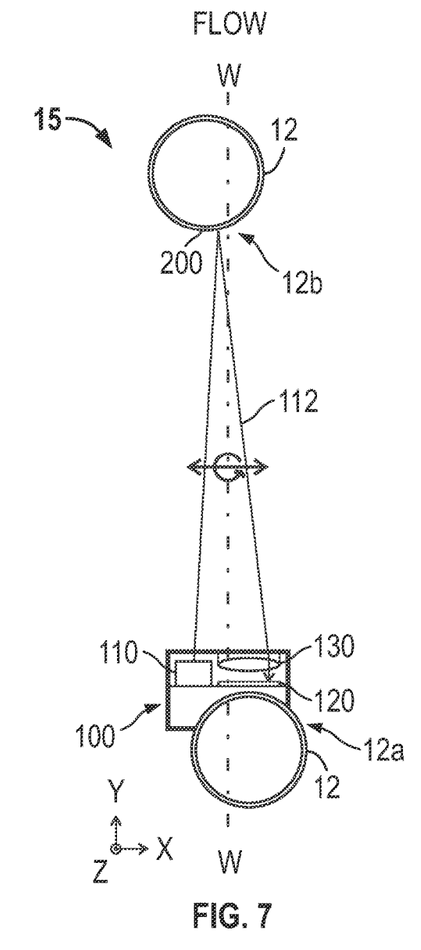

FIGS. 5, 6, and 7 show a sectional view of the system 15 taken from FIG. 1. As can be seen, the system 15 includes the vibratory element 12 and the emitter-sensor assembly 100 described in the foregoing. The vibratory element 12 is shown with the first position 12a and the second position 12b. Also shown in FIGS. 5, 6, and 7 is a sectional view of the emitter-sensor assembly 100. The sectional view of the emitter-sensor assembly 100 shows an emitter 110, a sensor 120, and a lens 130 disposed proximate the first position 12a. FIGS. 5, 6, and 7 also include a coordinate system with an X-axis, Y-axis, and Z-axis.

The emitter 110, sensor 120, and lens 130 are all shown as being disposed at the first position 12a. However, as described in the foregoing, the emitter 110, sensor 120, and lens 130 may be disposed away from the first position 12a in alternative embodiments. For example, the emitter 110 could be rigidly coupled to the first position 12a with a bracket and the sensor 120 and the lens 130 could be affixed to the vibratory element 12. The emitter 110 is coplanar and proximate to the sensor 120. The emitter 110 is also positioned to emit electro-magnetic radiation 112 towards the second position 12b. The sensor 120 is disposed parallel to the lens 130 and positioned to receive the electro-magnetic radiation 112 that is reflected by the reflective surface 200. The electro-magnetic radiation 112 is shown as being emitted at an angle relative to the bend axis W and in a plane formed by the first position 12a and the second position 12b that is parallel to the plane formed by the X-axis and the Y-axis. However, in alternative embodiments, any angle, including zero, may be employed. The electro-magnetic radiation 112 may also be transmitted outside the plane formed by the first position 12a and the second position 12b.

In embodiments where a reflective surface is disposed away from the second position, the electro-magnetic radiation may be emitted towards the second position even though it is emitted towards the reflective surface that is disposed away from the second position. For example, the reflective surface may be rigidly coupled to the second position with a bracket. The electro-magnetic radiation may be emitted by an emitter at the first position towards the reflective surface disposed away from the second position. The reflective surface may be configured to reflect the electro-magnetic radiation towards the first position.

Similarly, in embodiments where the sensor is disposed away from the first position may receive electro-magnetic radiation that is reflected towards the first position. For example, the sensor may be rigidly coupled to the first position and receive the electro-magnetic radiation that is reflected towards the sensor. Accordingly, the sensor may receive the electro-magnetic radiation that is reflected towards the first position. The received reflected electro-magnetic radiation may be employed to measure a spatiotemporal relationship between the first and second position.

FIGS. 5, 6, and 7 illustrate the different spatiotemporal relationships between the first position 12a and the second position 12b in different flow conditions, which may have different vibration modes. The flow conditions illustrated are rest, no flow, and flow conditions. Due to the different vibration modes, the second position 12b may move relative to the first position 12a. The electro-magnetic radiation 112 may therefore be reflected by the reflective surface 200 in different directions, depending on the vibration modes. Accordingly, where the electro-magnetic radiation 112 is received by the sensor 120 may depend on the vibration mode, as is discussed in more detail in the following.

In FIG. 5, the vibratory element 12 is in the rest condition, where the vibratory element 12 is not being vibrated and there is no flow. As a result, the vibratory element 12 is centered approximately over the bend axis W. As can be seen in FIG. 5, the electro-magnetic radiation 112 is received by the sensor 120 at the center of the sensor 120, which may be a reference location for the sensor 120. However, in alternative embodiments, the electro-magnetic radiation may be received by the sensor 120 at different locations while the vibratory element 12 is in the rest condition. As can be appreciated the location of the electro-magnetic radiation 112 or reference location may be associated with the rest condition.

In FIG. 6, the vibratory element 12 is in the no flow condition. The no flow condition may correspond to the drive mode described with reference to FIGS. 1 and 2. As shown in FIG. 6, the vibratory element 12 is displaced along the X-axis to one side of the bend axis W. However, the relative position of the first position 12a and the second position 12b along the X-axis is not different. Accordingly, the position of the electro-magnetic radiation 112 on the sensor 120 is not different than the position of the electro-magnetic radiation 112 when the vibratory element 12 is in the rest condition. It can therefore be appreciated that the position of the electro-magnetic radiation 112 shown in FIGS. 5 and 6 may be associated with both the rest and no flow conditions.

In FIG. 7, the vibratory element 12 is in the flow condition where material is flowing through the vibratory element 12 while the vibratory element 12 is vibrating. As can be seen, the first position 12a and the second position 12b are displaced to the sides of the bend axis W. In the exemplary illustration shown in FIG. 7, the first position 12a is displaced to the left of the bend axis W and the second position 12b is displaced to the right of the bend axis W. However, due to the vibration, the first position 12a and the second position 12b may be displaced on either side of the bend axis W. Additionally or alternatively, the first position 12a and the second position 12b may vibrate about an axis that is offset from the bend axis W.

As can be seen in FIG. 7, the electro-magnetic radiation 112 is not being received by the sensor 120 at the center of the sensor 120. More specifically, the electro-magnetic radiation 112 is offset from the center of the sensor 120. This is due to the phase difference between the first position 12a and the second position 12b. As can also be appreciated by comparing FIGS. 5, 6, and 7, the position where the electro-magnetic radiation 112 is received by the sensor 120 changed from the rest or no flow condition to the flow condition due to a change in the phase difference between the first position 12a and the second position 12b. That is, the change in the phase difference caused the electro-magnetic radiation 112 to be reflected in a different direction.

More specifically, as shown in FIGS. 5 and 6, the electro-magnetic radiation 112 is reflected by the reflective surface 200 at the same position, which is to the left of the bend axis W and to the left of a center of the reflective surface 200 (where a projection of the bend axis W along the Z-axis traverses the reflective surface 200 when the vibratory element 12 is in the rest condition). Due to the angle of the electro-magnetic radiation 112 emitted by the emitter-sensor assembly 100 relative to the bend axis W, the curve of the reflective surface 200, and the bending by the lens 130, the electro-magnetic radiation 112 is reflected by the reflective surface 200 to the center of the sensor 120, which may be the reference location of the sensor 120.

The twist mode shown in FIG. 7 causes the electro-magnetic radiation 112 to be received by the sensor 120 at an offset location that is not the center of the sensor 120. More specifically, the electro-magnetic radiation 112 is being reflected from the right of the center of the reflective surface 200. That is, due to the twist mode, the second position 12b has displaced in a negative direction along the X-axis while the first position 12a has displaced in the positive direction along the X-axis. This causes the electro-magnetic radiation 112 to be directed to the right of the center of the reflective surface 200. Accordingly, the electro-magnetic radiation 112 is reflected at a different angle from the reflective surface 200. The electro-magnetic radiation 112 is therefore received at the right of the center of the sensor 120.

As can be appreciated from FIGS. 5, 6, and 7, the position where the sensor 120 receives the electro-magnetic radiation 112 will vary during the vibration of the vibratory element 12 during flow. For example, the electro-magnetic radiation 112 may move from a first side of the sensor 120 to a second side of the sensor 120 and then back to the first side during a single cycle of the flow-induced twist mode. This is due to a change in the phase difference between the first position 12a and the second position 12b, the phase difference being a spatiotemporal relationship between the first position 12a and the second position 12b. As will be explained in the following, the sensor 120 may be employed to provide a signal that is proportional to the location of the electro-magnetic radiation 112 on the sensor 120.

Figure 8:
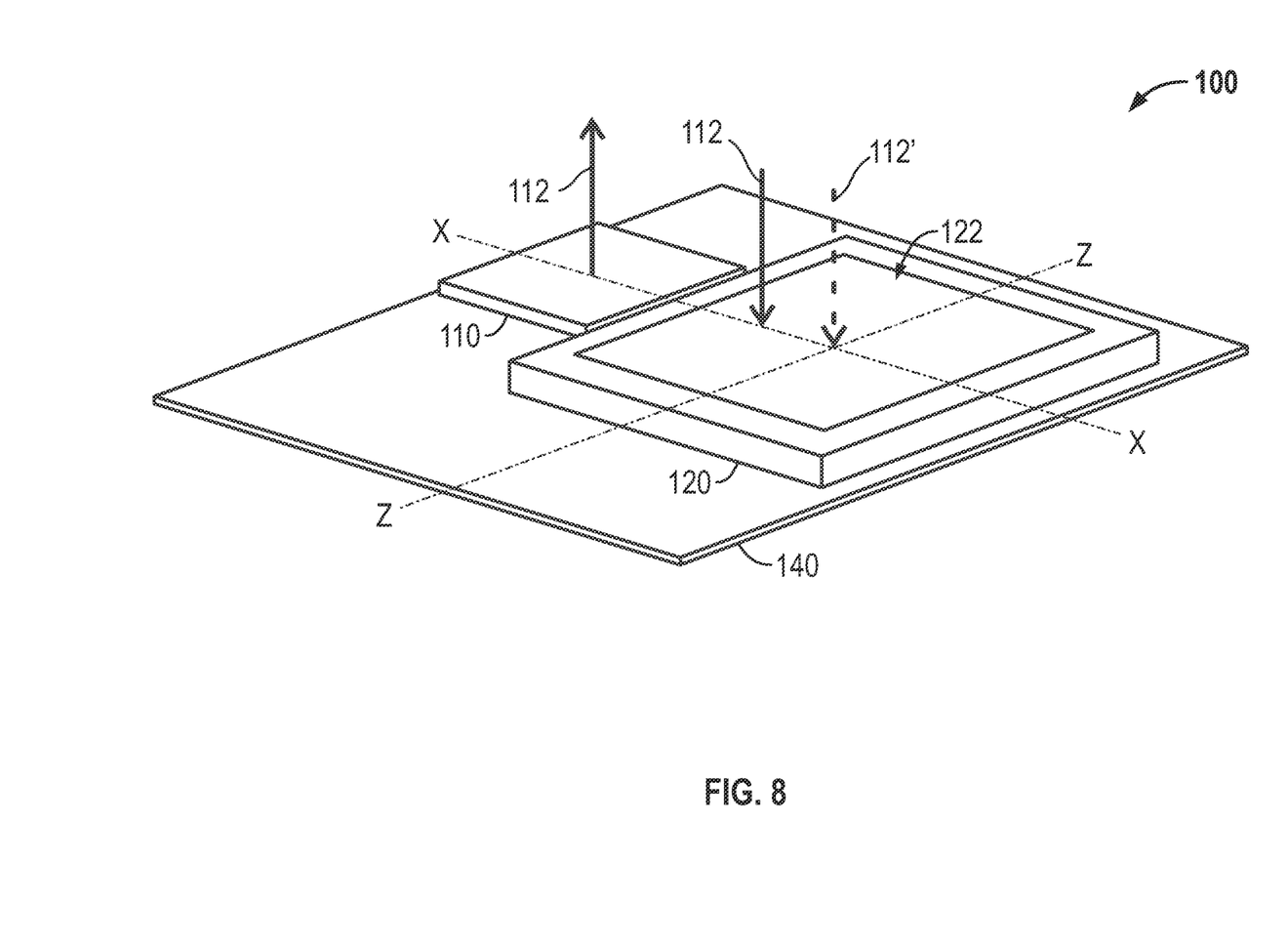
FIG. 8 shows a perspective view of the emitter-sensor assembly 100 described in the foregoing.

FIG. 8 shows a perspective view of the emitter-sensor assembly 100 described in the foregoing. For additional clarity, the emitter-sensor assembly 100 is not shown with the lens 130 described in the foregoing with reference to FIGS. 5, 6, and 7. As shown in FIG. 8, the emitter-sensor assembly 100 includes the emitter 110 and the sensor 120 described in the foregoing. The emitter-sensor assembly 100 is also shown as including a circuit board 140, to which the emitter 110 and sensor 120 are coupled. Also shown in FIG. 8 is the X-axis and Z-axis described in the foregoing. Along the X-axis is the electro-magnetic radiation 112 emitted by the emitter 110 and the electro-magnetic radiation 112 received by the sensor 120. Also shown is the electro-magnetic radiation 112' that may be received at the reference location of the sensor 120, which is in a sensing area 122 of the sensor 120.

The sensor 120 is configured to provide a signal that is proportional to a position where the electro-magnetic radiation 112 is received by the sensor 120. The sensor 120 is shown as being a two-axis position sensitive detector (PSD) where the position of the electro-magnetic radiation 112 can be determined along both the X-axis and Z-axis. However, in alternative embodiments, any appropriate sensor may be employed. For example, the sensor 120 may be an array of photo-sensitive diodes with a gridded coordinate system that measures the location of the electro-magnetic radiation 112.

In the embodiment shown, the sensor 120 provides a current in proportion to the distance from the reference location of the sensing area 122, the reference location being the intersection of the X-axis and Y-axis. For example, if the electro-magnetic radiation 112 were received by the sensor 120 along the X-axis at a first end of the sensing area 122, then the current may be at a full-scale current for the sensor 120 that is provided by a lead at the first end. If the electro-magnetic radiation 112 were to be received at a second end of the sensing area 122 along the X-axis, the current may be the full scale current provided over a lead at the second end. If the electro-magnetic radiation 112 were received by the sensor 120 at the reference location, illustrated by the electro-magnetic radiation 112', then a half scale current may be provided over both the leads at the first and second end. The currents provided by the leads may be included in a signal provided by the sensor 120.

The signal provided by the sensor 120 may be received by the meter electronics 20 described in the foregoing with reference to FIGS. 1 and 2. The meter electronics 20 can employ the signal provided by the emitter-sensor assembly 100 to measure the spatiotemporal relationship between the first position 12a and the second position 12b. An exemplary method is described in the following with reference to FIG. 9.

Figure 9:
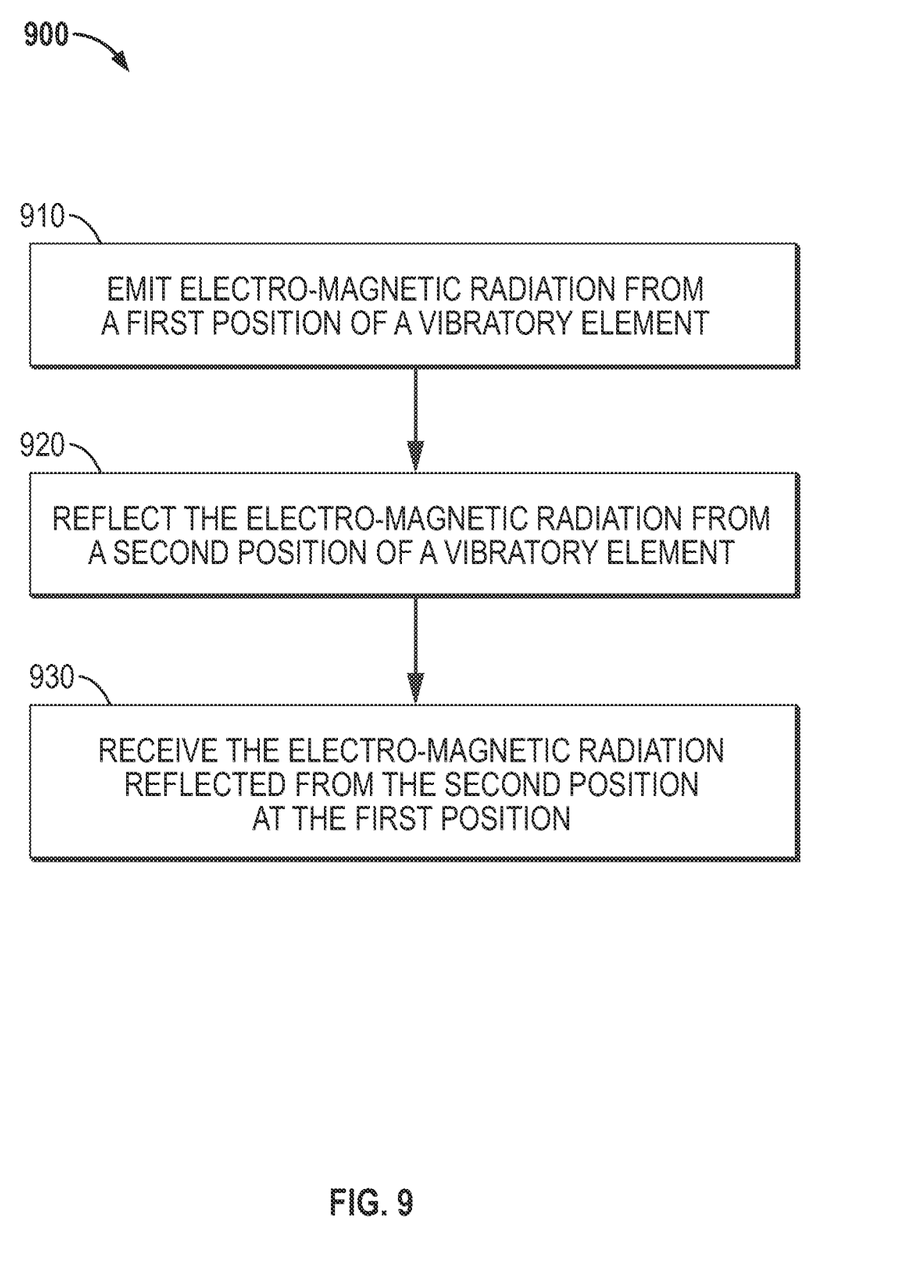
FIG. 9 shows a method 900 for measuring a spatiotemporal relationship between two or more positions of a vibratory element according to an embodiment.

FIG. 9 shows a method 900 for measuring a spatiotemporal relationship between two or more positions of a vibratory element according to an embodiment. As shown in FIG. 9, the method 900 begins by emitting electro-magnetic radiation from a first position of a vibratory element in step 910. The first position may be the first position 12a and the vibratory element may be the vibratory element 12 described in the foregoing. In step 920, the method 900 reflects the electro-magnetic radiation from the second position of the vibratory element. The second position may be the second position 12b described in the foregoing. In step 930, the method 900 can receive the electro-magnetic radiation reflected from the second position at the first position.

The step 910 of emitting the electro-magnetic radiation from the first position may be performed by the emitter 110 described in the foregoing. For example, the emitter 110 may be disposed at the first position 12a as shown in FIGS. 5-7. Alternatively, the step 910 of emitting the electro-magnetic radiation may be performed by an emitter that is disposed away from the first position. For example the emitter may be rigidly coupled to the first position by a bracket.

The step 920 of reflecting the electro-magnetic radiation from the second position may be performed by the reflective surface 200 described in the foregoing. For example, the reflective surface 200 may comprise a surface of the vibratory element 12. Accordingly, the electro-magnetic radiation 112 may be reflected by the surface of the vibratory element 12 at the second position 12b. Alternatively, the step 920 of reflecting the electro-magnetic radiation from the second position may be performed by a reflective surface that is disposed away from the second position. For example, the reflective surface may be rigidly coupled to the second position with a bracket.

The step 930 of receiving the electro-magnetic radiation reflected from the second position may be performed by the sensor 120 described in the foregoing. Accordingly, the sensor 120 may be disposed at the first position 12*a*. Alternatively, the step of receiving the electro-magnetic radiation reflected from the second position may be performed by a sensor that is disposed away from the first position. For example, the sensor that receives electro-magnetic radiation reflected from the second position may be rigidly coupled to the first position with a bracket.

As described in the foregoing, the sensor 120 may provide a signal to the meter electronics 20 that is proportional to the location on the sensor where the electro-magnetic radiation 112 is received. The meter electronics 20 can employ the signal to calculate, for example, a phase difference between the first position 12*a* and the second position 12*b* on the vibratory element 12. For example, where the reference location shown in FIG. 8 is associated with zero phase difference, then the half scale current may be digitized as a zero value. Signal conditioning may ensure that the full scale of the sensor 120 corresponds to a full scale of an analog to digital converter in the meter electronics 20. Accordingly, with reference to the flow meter 5 described in the foregoing, the full scale of the sensor 120 may correspond to the full flow of the material through the flow meter 5.

The embodiments described above provide for measuring a spatiotemporal relationship between two or more positions 12*a*, 12*b* on a vibratory element 12. As explained above, measuring the spatiotemporal relationship between the two or more positions 12*a*, 12*b* on the vibratory element 12 can be done by the emitter-sensor assembly 100 rigidly coupled to the first position 12*a*. Accordingly, the sensor assembly 10, which includes the emitter-sensor assembly 100 and the vibratory element 12, may have a simpler design and have more reliable measurements.

For example, the emitter-sensor assembly 100 may have only a single wire assembly that receives and provides signals from the meter electronics 20. Through the single wire assembly, the emitter-sensor assembly 100 can receive a signal from the meter electronics 20 that causes an emitter 110 to emit electro-magnetic radiation and provide a signal to the meter electronics 20 that is proportional to the position of the electro-magnetic radiation received by the emitter-sensor assembly 100. Additionally, the emitter-sensor assembly 100 may be coupled to a single position which is a less complex vibratory sensor assembly design. The measurements may also be more reliable because tolerances of two or more sensors are not stacked up, there may be less noise coupling to the meter electronics 20, etc.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other measurements of a spatiotemporal relationship between two or more positions on a vibratory element and not just to the embodiments described above and shown in the accompanying figures. Accordingly, the scope of the embodiments described above should be determined from the following claims.

I claim:

1. An emitter-sensor assembly (100) for measuring a spatiotemporal relationship between two or more positions of a vibratory element (12), comprising:
    an emitter (110) substantially rigidly coupled to a first position (12*a*) of the vibratory element (12), the emitter (110) configured to emit electro-magnetic radiation (112) towards a second position (12*b*) of the vibratory element (12);
    a sensor (120) substantially rigidly coupled to the first position (12*a*) of the vibratory element (12), the sensor (120) configured to receive the electro-magnetic radiation (112) reflected from the second position (12*b*) of the vibratory element (12); and
    a meter electronics (20) configured to determine a phase difference between oscillations of the vibratory element (12) at the first position (12*a*) and oscillations of the vibratory element (12) at the second position (12*b*) based on the electro-magnetic radiation (112) received.

2. The emitter-sensor assembly (100) of claim 1, further comprising a lens (130) that is positioned to receive the electro-magnetic radiation (112) reflected from the second position (12*b*) of the vibratory element (12) and direct the electro-magnetic radiation (112) towards the sensor (120).

3. The emitter-sensor assembly (100) of claim 1, wherein at least one of the emitter (110) and the sensor (120) is disposed at the first position (12*a*).

4. The emitter-sensor assembly (100) of claim 1, wherein at least one of the emitter (110) and the sensor (120) is disposed away from the first position (12*a*).

5. The emitter-sensor assembly (100) of claim 1, wherein the emitter (110) is a light emitting diode or a laser.

6. The emitter-sensor assembly (100) of claim 1, wherein the sensor (120) is a position sensor detector that detects the position of the electro-magnetic radiation (112) on sensing area (122) of a photo-diode.

7. The emitter-sensor assembly (100) of claim 1, wherein the vibratory element (12) is a flow tube in a flow meter (5).

8. A method for measuring a spatiotemporal relationship between two or more positions of a vibratory element, the method comprising:
    emitting electro-magnetic radiation from a first position of the vibratory element;
    reflecting the electro-magnetic radiation from a second position of the vibratory element; and
    receiving the electro-magnetic radiation reflected from the second position, the electro-magnetic radiation being received by a sensor rigidly coupled to the first position; and
    determining a phase difference between oscillations of the vibratory element at the first position and oscillations of the vibratory element at the second position based on the electromagnetic radiation received.

9. The method of claim 8, further comprising determining a movement of the second position along an axis relative to the position of the first position on the axis.

10. The method of claim 8, further comprising:
vibrating the vibratory element with a driver, wherein the vibratory element comprises a flow tube in a flow meter; and
twisting the vibratory element with Coriolis forces such that the second position is displaced relative to the first position.

11. The method of claim 8, wherein reflecting the electro-magnetic radiation from the second position comprises reflecting the electro-magnetic radiation from a surface of the vibratory element at the second position.

12. The method of claim 8, wherein reflecting the electro-magnetic radiation from the second position comprises reflecting the electro-magnetic radiation from a surface that is rigidly coupled to the second position.

13. A system (15) for measuring a spatiotemporal relationship between two or more positions of a vibratory element (12), the system (15) comprising:
an emitter-sensor assembly (100) rigidly coupled to a first position (12a) of the vibratory element (12); and
a reflective surface (200) that is one of disposed at and disposed away from a second position (12b) of the vibratory element (12);
wherein the emitter-sensor assembly (100) is configured to:
emit electro-magnetic radiation (112) towards the second position (12b) of the vibratory element (12);
receive the electro-magnetic radiation (112) reflected from the second position (12b) to measure a twist mode of the vibratory element (12).

14. The system (15) of claim 13, wherein the reflective surface (200) is a portion of the vibratory element (12) at the second position (12b).

15. The system (15) of claim 13, wherein the reflective surface (200) is a surface that is rigidly coupled to the second position (12b).

16. The system (15) of claim 13, wherein the emitter-sensor assembly (100) is comprised of:
an emitter (110) substantially rigidly coupled to the first position (12a) of the vibratory element (12), the emitter (110) configured to emit electro-magnetic radiation (112) towards the second position (12b) of the vibratory element (12); and
a sensor (120) substantially rigidly coupled to the first position (12a) of the vibratory element (12), the sensor (120) being configured to receive the electro-magnetic radiation (112) reflected from the second position (12b) of the vibratory element (12).

17. The system (15) of claim 13, wherein the electro-magnetic radiation (112) is light.

* * * * *